(12) United States Patent
Wang (10) Patent No.: US 11,294,864 B2
(45) Date of Patent: Apr. 5, 2022

(54) DISTRIBUTED TRANSACTIONS WITH REDO-ONLY WRITE-AHEAD LOG

(71) Applicant: VMware, Inc., Palo Alto, CA (US)

(72) Inventor: Wenguang Wang, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 1234 days.

(21) Appl. No.: 14/716,834

(22) Filed: May 19, 2015

(65) Prior Publication Data
US 2016/0342616 A1  Nov. 24, 2016

(51) Int. Cl.
*G06F 16/00* (2019.01)
*G06F 16/17* (2019.01)
*G06F 9/455* (2018.01)

(52) U.S. Cl.
CPC ...... *G06F 16/1734* (2019.01); *G06F 9/45533* (2013.01)

(58) Field of Classification Search
CPC ......... G06F 17/30575; G06F 17/30368; G06F 16/273; G06F 16/2365; G06F 16/2379; G06F 16/1734; G06F 9/45533
See application file for complete search history.

(56) References Cited

U.S. PATENT DOCUMENTS

| | | | |
|---|---|---|---|
| 8,359,593 B2 * | 1/2013 | Golosovker | G06F 9/4856 718/1 |
| 9,553,951 B1 * | 1/2017 | Nguyen | H04L 67/42 |
| 10,019,321 B1 * | 7/2018 | Aron | G06F 17/30575 |
| 2004/0133591 A1 * | 7/2004 | Holenstein | G06F 11/2064 |
| 2006/0167960 A1 * | 7/2006 | Lomet | G06F 17/30353 |
| 2007/0067266 A1 * | 3/2007 | Lomet | G06F 17/30864 |
| 2008/0189431 A1 * | 8/2008 | Hyslop | H04W 74/06 709/232 |
| 2011/0137864 A1 * | 6/2011 | Deshmukh | G06F 17/30575 707/648 |
| 2012/0023077 A1 * | 1/2012 | Kann | G06F 17/30581 707/702 |
| 2012/0179645 A1 * | 7/2012 | Lomet | G06F 17/30575 707/607 |
| 2013/0019000 A1 * | 1/2013 | Markus | G06F 9/466 709/223 |
| 2013/0066948 A1 * | 3/2013 | Colrain | H04L 67/146 709/203 |

(Continued)

OTHER PUBLICATIONS

Mohan et al., "Transaction Management in the R Distributed Database Management System", 1986, ACM.*

*Primary Examiner* — Jared M Bibbee (57) ABSTRACT

Examples perform transactions across a distributed system of elements, such as nodes, computing devices, objects, and virtual machines. The elements of the distributed system maintain data (e.g, tables) which include information on transactions previously received and the source of the transactions. A first element of the distributed system transmits a transaction, the identifier (ID) of the first element, and a transaction ID to a plurality of second elements. The second elements compare the transaction ID to the maximum transaction ID associated with the first element and stored in the tables to determine whether the transaction is the most recent and should be performed, or whether the transaction has already been performed and should not be re-performed. In this manner, undo logs are not needed.

20 Claims, 7 Drawing Sheets

(56) References Cited

U.S. PATENT DOCUMENTS

| | | | |
|---|---|---|---|
| 2013/0066949 A1* | 3/2013 | Colrain | G06F 9/466 709/203 |
| 2013/0110767 A1* | 5/2013 | Tatemura | G06F 17/30315 707/607 |
| 2013/0110883 A1* | 5/2013 | Junqueira | G06F 17/30359 707/803 |
| 2014/0258223 A1* | 9/2014 | Cao Minh | G06F 16/27 707/610 |
| 2014/0337303 A1* | 11/2014 | Little | G06F 9/466 707/703 |
| 2015/0355985 A1* | 12/2015 | Holtz | G06F 11/2094 714/6.11 |
| 2016/0110403 A1* | 4/2016 | Lomet | G06F 16/2255 707/695 |
| 2016/0147786 A1* | 5/2016 | Andrei | G06F 16/1756 707/695 |
| 2016/0147813 A1* | 5/2016 | Lee | G06F 16/128 707/703 |

* cited by examiner

DISTRIBUTED TRANSACTIONS WITH REDO-ONLY WRITE-AHEAD LOG

BACKGROUND

Some existing distributed systems involving multiple elements such as nodes or objects accessing shared resources rely on a two-phase commit protocol to process transactions amongst a network of participants. For instance, in the first phase a coordinator or control element of the distributed system will attempt to prepare all of the participating elements of the system for a transaction by sending them the transaction and receiving their response (commit or abort). In the second phase, the coordinator will send a message either instructing the participants to commit the transaction, or abort the transaction based on the results of the first phase. However, the implementation complexity and performance overhead of the two-phase commit protocol is high, and the system can be susceptible to permanent failures. Further, some existing systems maintain both a redo log and an undo log for tracking transactions and the corresponding undo for the transaction. However, the undo operations are expensive because they require reads from storage.

BRIEF DESCRIPTION OF THE DRAWINGS

Corresponding reference characters indicate corresponding parts throughout the drawings.

DETAILED DESCRIPTION

Examples described herein allow for transactions to be performed by elements in a distributed system with less resource consumption than existing two-phase commit protocols in part by eliminating the use of the undo log. In some examples, the elements are nodes, computing devices, virtual machines, objects, etc. A first element of the distributed system, called a source element or control element, assigns a transaction identifier (ID) to a transaction. The control element transmits the transaction, the transaction ID, and a client ID associated with the control element (e.g., unique among the elements) to a plurality of second elements, described as service elements. The transaction ID is, in some examples, a time stamp, numeric value, or other indicator that the present transaction is later in time, or more recent, than any previous transaction. The plurality of second elements compares the transaction ID to a set of transaction IDs maintained by each of the plurality of elements (e.g., in a table). If the transaction ID is greater than a maximum transaction ID associated with the control element in the table, then the transaction is performed and the table is updated accordingly; otherwise, the transaction is not performed (e.g., the transaction had been performed previously or it is considered out of date). Whether the transaction is performed or not performed, success is reported to the first element. In this manner, no transaction is committed multiple times thus avoiding corruption of data. Alternatively, performing a transaction is described as "executing", "storing", "performing", etc. Not performing a transaction is described alternatively as "not executing", "aborting" (although no transactions are aborted since the redo log cannot abort transactions), "discarding", "not storing", "ignoring", etc.

This described method of processing transactions over a distributed system eliminates use of an undo log, as the plurality of second elements need only maintain a redo or write log. Eliminating the need for an undo log reduces expensive storage read operations. This method of processing distributed transactions is applicable to virtualized and non-virtualized environments, and is resistant to failures occurring in such systems. If an element in a cluster of elements sharing storage, for example a node in a cluster of nodes, fails, a second element of the cluster may replay the log associated with the failed element. Further, since every element maintains a transaction ID table, none of the elements inadvertently re-perform any transaction which has already been executed. In this manner, only the most recent transactions are processed by an element, instead of processing transactions that have already been performed.

Maintaining the table of transaction IDs and only performing transactions whose transaction ID is greater than the current maximum transaction ID permits any transaction to be viewed as idempotent. Generally, a transaction is considered to be idempotent if it can be applied multiple times without changing the result from the initial application. For instance, if a transaction to increment a variable by 1 is given a transaction ID of 5, and the maximum transaction ID found in the table is 4, then the variable will be incremented by 1 and the maximum transaction ID is set to 5. However, if the same transaction is attempted a second time (e.g., a replay), the transaction ID remains 5 as the maximum transaction ID was previously set to 5. In the second instance, the variable will not be incremented by 1. In this manner, any transaction, although not idempotent in nature, become idempotent by virtue of how it is processed in the distributed system. Likewise, only the latest in time or most recent transaction are processed, preventing the nodes from repeatedly performing older, stale, or otherwise already-performed transactions.

Aspects of the disclosure replace the two-phase commit protocol with a simplified transaction. The examples described herein save processing time and storage resources by only writing, to the redo log, transactions, and an undo log is not maintained.

Aspects of the disclosure also reduce latency, as less back and forth communication is required between the elements of the distributed system. For example, the first element or control element does not poll the other elements, send a commit/abort instruction, and receive a response as in a two-phase commit protocol, but rather the first element transmits the transaction and waits for a report of success.

Further, aspects of the disclosure reduce the need to lock resources or processes, since no transactions need to be undone. Additionally, failures of any one element of the distributed system are less catastrophic, as any other element of the distributed system may read from the redo log of the failed element and replay transactions from the redo log in an idempotent manner.

Figure 1:
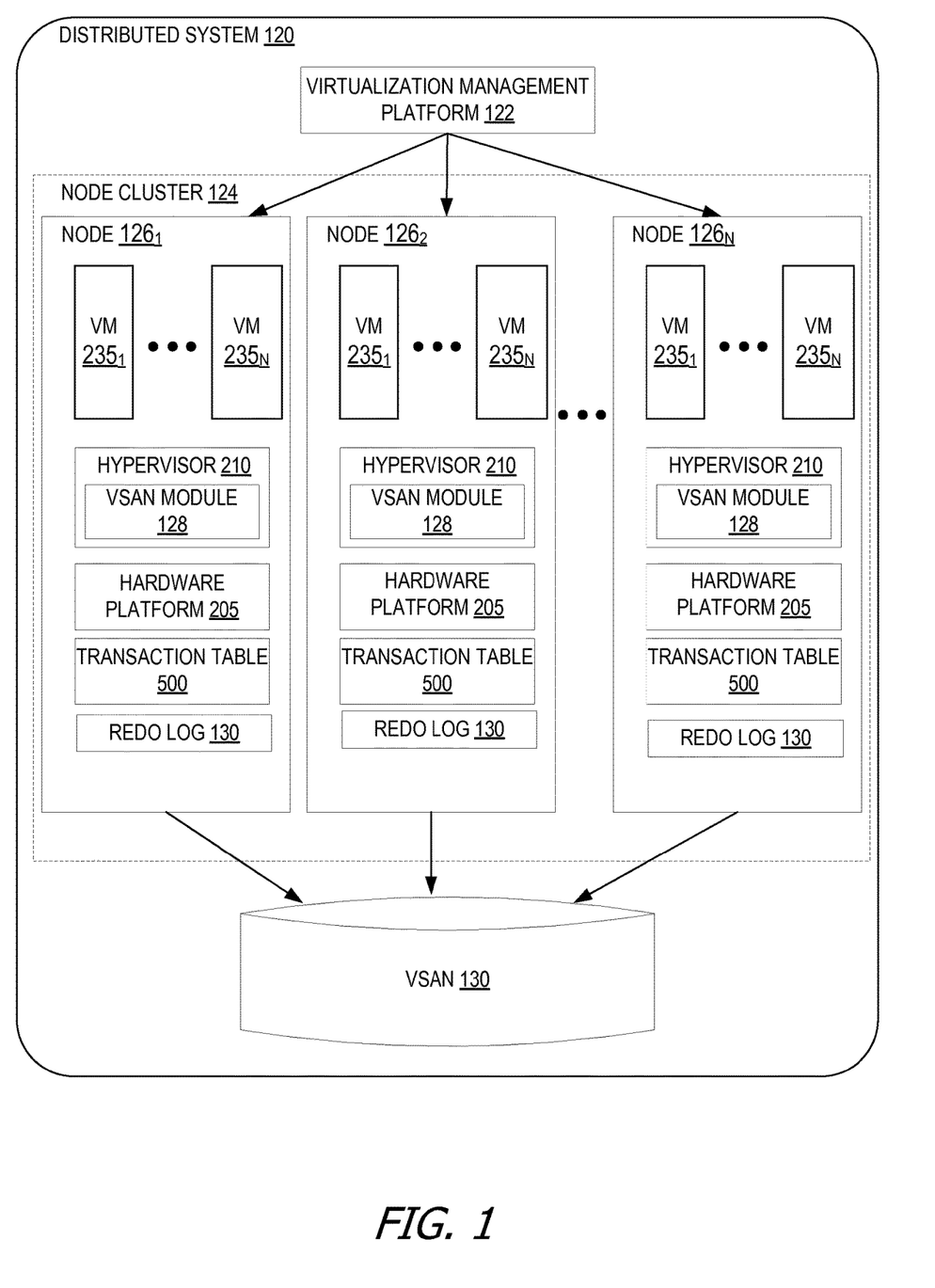
FIG. 1 is a block diagram of a distributed system for implementing distributed transactions with a redo-only write-ahead log.

FIG. 1 is a block diagram of a distributed system 120 for implementing distributed transactions with the redo-only write-ahead log. The illustrated system is a software-based virtual storage area network (vSAN); however, the disclosure is applicable to other distributed systems and non-virtual environments, also. The distributed system 120 has at least one set of elements; in the illustrated example the elements are nodes 126. Although the illustrated distributed system shows nodes as the elements in the distributed system, any other participants are encompassed. The participants are, in some examples, computing devices, processing elements, nodes, or other objects. The nodes 126 are, in some examples, grouped together in a node cluster 124.

The nodes 126 are managed, in some examples, by a virtualization management platform (VMP) 122. The VMP 122 allows for the configuration of VMs on the various nodes 126. In some examples, the VMP 122 maintains and assigns IDs to each element of the distributed system 120. In some examples the VMP 122 also assigns transaction IDs, or maintains a record of the maximum transaction ID associated with each node 126, as described more fully below.

Each node 126 includes, in some examples, a hypervisor 210, a hardware platform 205, a client-transaction-ID table 500, and a plurality of virtual machines (VMs) 235. However, aspects of the disclosure are operable in examples without VMs. The hypervisor coordinates the VMs 235 operating on each node 126. Additionally, the hypervisor includes a vSAN module 128, in some examples. The vSAN module 128, in some examples, operates as a storage management module. The vSAN module 128 manages the creation of and access to objects in an object store based on existing storage policies. The hardware platform 205 is illustrated and described in more detail in FIG. 7, as are the VMs 235 and the hypervisor 210. In one example, vSphere Hypervisor from VMware, Inc. is the hypervisor 210, and vCenter Server from VMware, Inc. is the VMP 122.

In the example of FIG. 1, the vSAN modules 128 act as vSAN device drivers within the hypervisor 210, providing access to the vSAN 130. However, the disclosure is operable with non-virtualized storage as well. In either environment, device objects are created and utilized by the nodes 126 or other elements of the distributed system 120.

In the example of FIG. 1, the nodes communicate with a vSAN 130. The vSAN 130 may correlate to, or be backed by, a combination of solid state drives and/or magnetic or spinning disks. In some examples, the connected storage may be virtual disks, virtual volumes, non-virtual storage, or any combination thereof. The distributed system is, in some examples, tightly coupled. In a tightly coupled system, the elements are highly coordinated, and multiple nodes 126 either share access to the same storage or share access to the storage of each other node 126. The example of FIG. 1 illustrates a vSAN architecture. In the illustrated example, the local storage of each node 126 or host is aggregated by the vSAN modules to create a logical SAN. In this example, the nodes do not share the same single storage. Instead, that all share access to the local storage of each other node.

Each node includes a redo log 130. Each log includes, in some examples, a pointer or log head to indicate where in the log the node is operating. Further, each log includes, in some examples, a start and an end which may be modified by the node 126.

Figure 2:
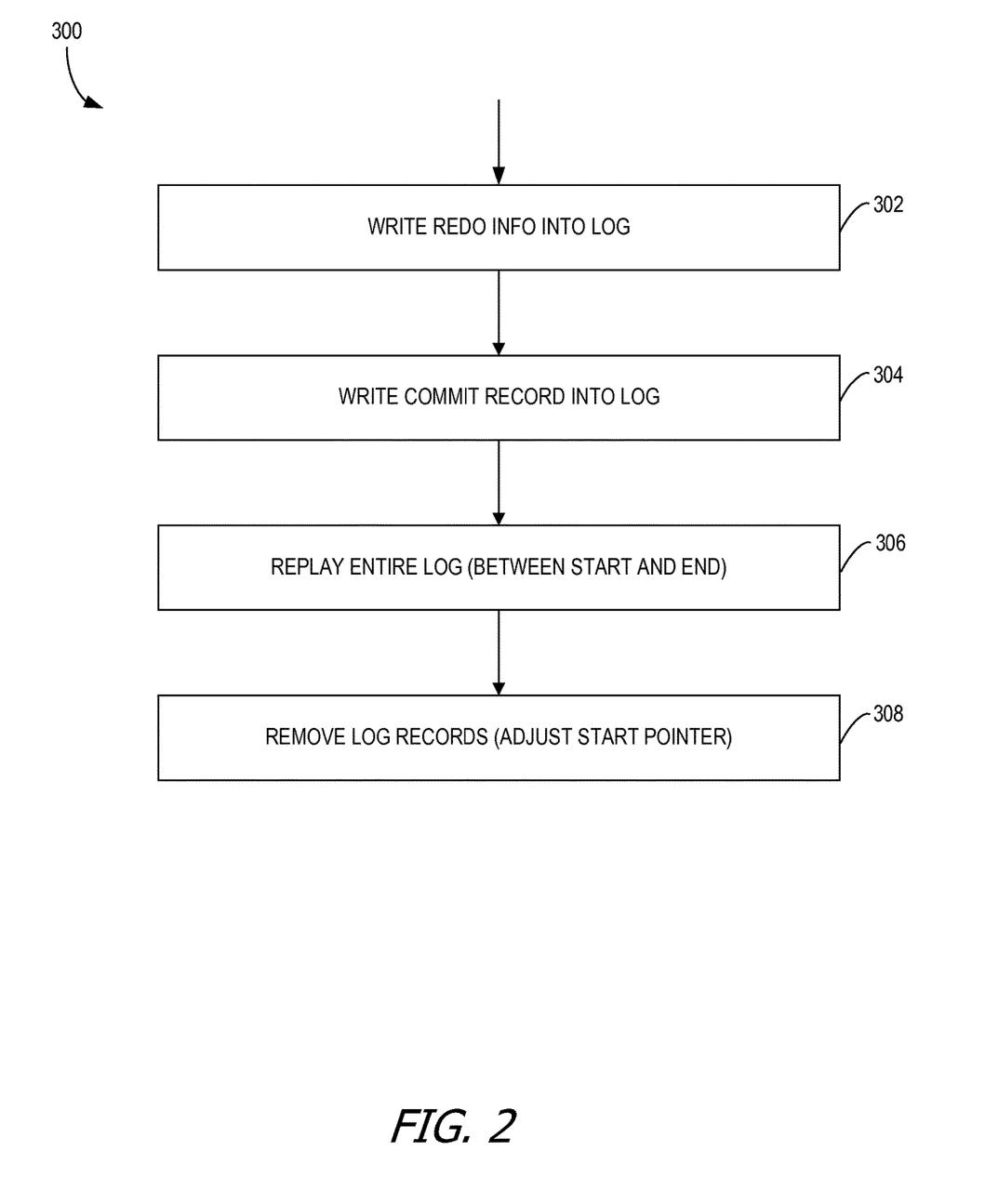
FIG. 2 is a flowchart of an exemplary method of making distributed transactions using the redo-only write-ahead log in place of a two-phase commit protocol, as performed by a control node.

The client-transaction-ID table 500 (abbreviated to "transaction table" in FIG. 1) records the client-ID 502 of any node sending a transaction, the transaction ID 504 of the transmitted transaction, and the transaction 506 to be performed. In some examples, the client-transaction-ID table 500 is maintained in the redo log 130. FIG. 2 is a flowchart of an exemplary method of making distributed transactions using the redo-only write-ahead log in place of the known two-phase commit protocol, as performed by the node transmitting the transaction. The nodes 126 are described as "control node" $126_{CN}$ (e.g., the control node transmits the transaction to the other nodes) and "service node" $126_{SN}$ (e.g., the service node receives the transaction and acts on it) based on their role in an instance of transaction performance. In some examples, there is no designated "control node" 126. In that example, any node 126 which initiates a transaction is a control node $126_{CN}$, and the other nodes 126 are service nodes 126. In some examples the control node is described as the first node 126 or the coordinator. The service node $126_{SN}$ is described, in some examples, as the second node 126, participant, cohort, or worker. While only one service node $126_{SN}$ is illustrated, it is understood that multiple service nodes $126_{SN}$ are, in some examples, communicating with the control node $126_{CN}$. Likewise, as described above in the detailed description for FIG. 1, although the example is illustrated with nodes it is understood that the disclosure is applicable to computing devices, objects, or any other elements of a distributed system.

At 302 the control node $126_{CN}$ writes the transaction, in some examples the redo information, into its log. Multiple transactions can be written by the control node $126_{CN}$. Subsequently, at 304, the control node $126_{CN}$ writes a commit record into its log. In some examples, this process repeats several times before the control node $126_{CN}$ replays the entire log between the start and end at 306. For example, a batch of log records (e.g., several sets of transactions and commit commands) are replayed, rather than replaying one set of transactions and its associated commit record at a time. In some examples, when a transaction is committed, only in-memory state is updated so that the results of the transaction are visible to other elements. In that example, after unplayed transactions in the log accumulate to a certain threshold, they are replayed to reduce memory usage and log size. The start and end pointers control which portion of the log is "live" or "active". Replaying the log, in some examples, includes transmitting the transaction, including the transaction ID 504, the actual transaction 506 to be performed, and the client ID 502, to the service nodes $126_{SN}$. After the log is replayed, the start pointer is adjusted at 308. In some examples, the end pointer is adjusted as new writes are made to the log. In other examples, the start pointer is adjusted after a portion of the log has been replayed, so that it is not replayed again.

In contrast to existing two-phase commit protocols, the control node $126_{CN}$ does not send a "prepare to commit" message to the service nodes $126_{SN}$. Instead, only one transmission, the transmission of the transactions, is made by the control node $126_{CN}$. The present example reduces the latency in a transaction in a distributed system, since fewer messages are exchanged between the control node $126_{CN}$ and the service nodes $126_{SN}$.

Figure 3:
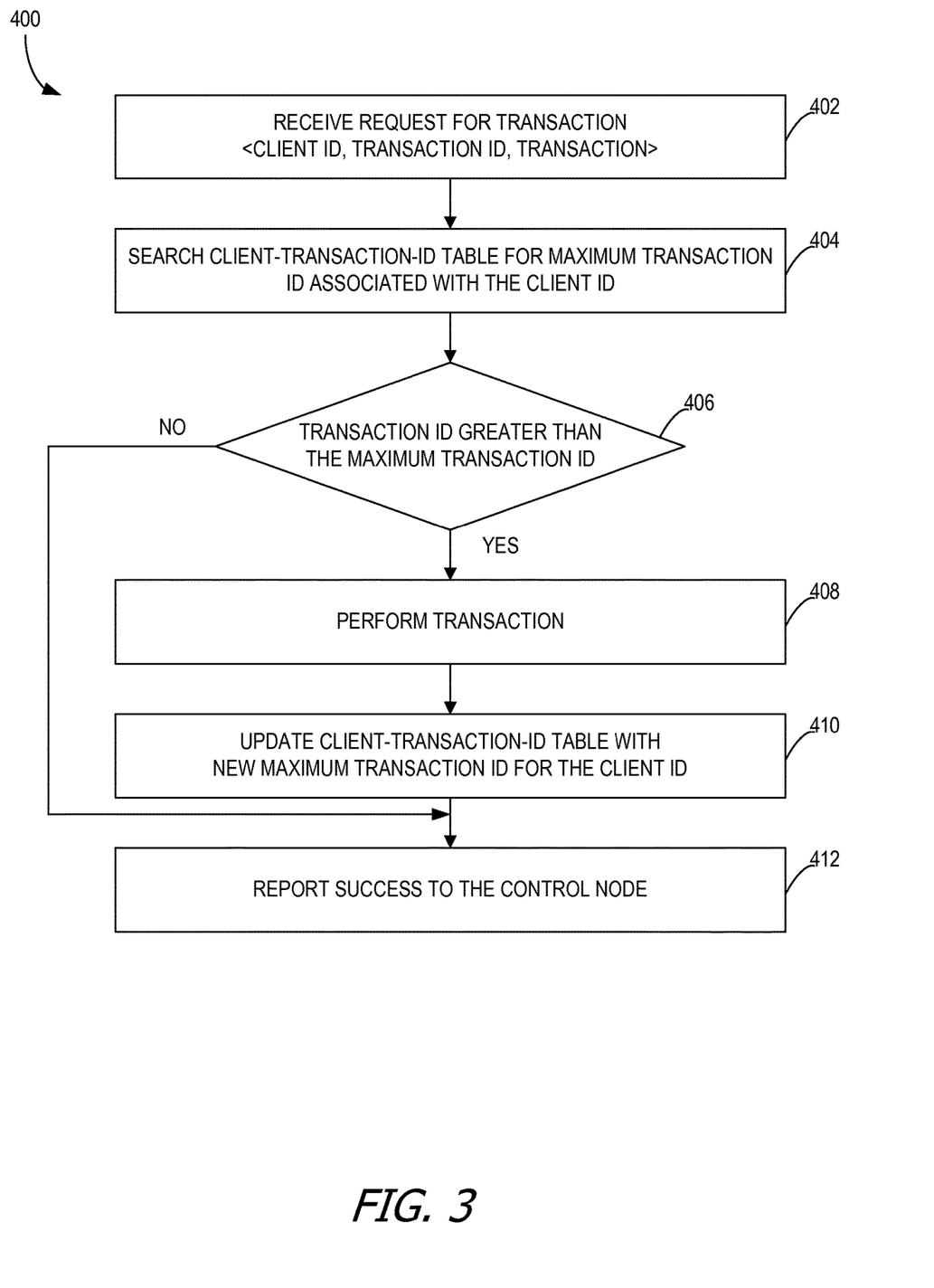
FIG. 3 is a flowchart of an exemplary method of making distributed transactions using the redo-only write-ahead log in place of a two-phase commit protocol, as performed by a service node.

FIG. 3 is a flowchart of an exemplary method of making distributed transactions using the redo-only write-ahead log in place of the known two-phase commit protocol, as performed by a service node $126_{SN}$. While method 400 is described with reference to execution by a processor, or a hypervisor associated with the service node, it is contemplated that method 400 may be performed by any computing device. Further, execution of the operations illustrated in FIGS. 2 and 3 are not limited to a VM environment, but are applicable to any distributed system. Also, one or more computer-readable storage media storing computer-executable instructions may execute to cause a processor to implement the transactions by performing the operations illustrated in FIG. 3.

Figure 5:
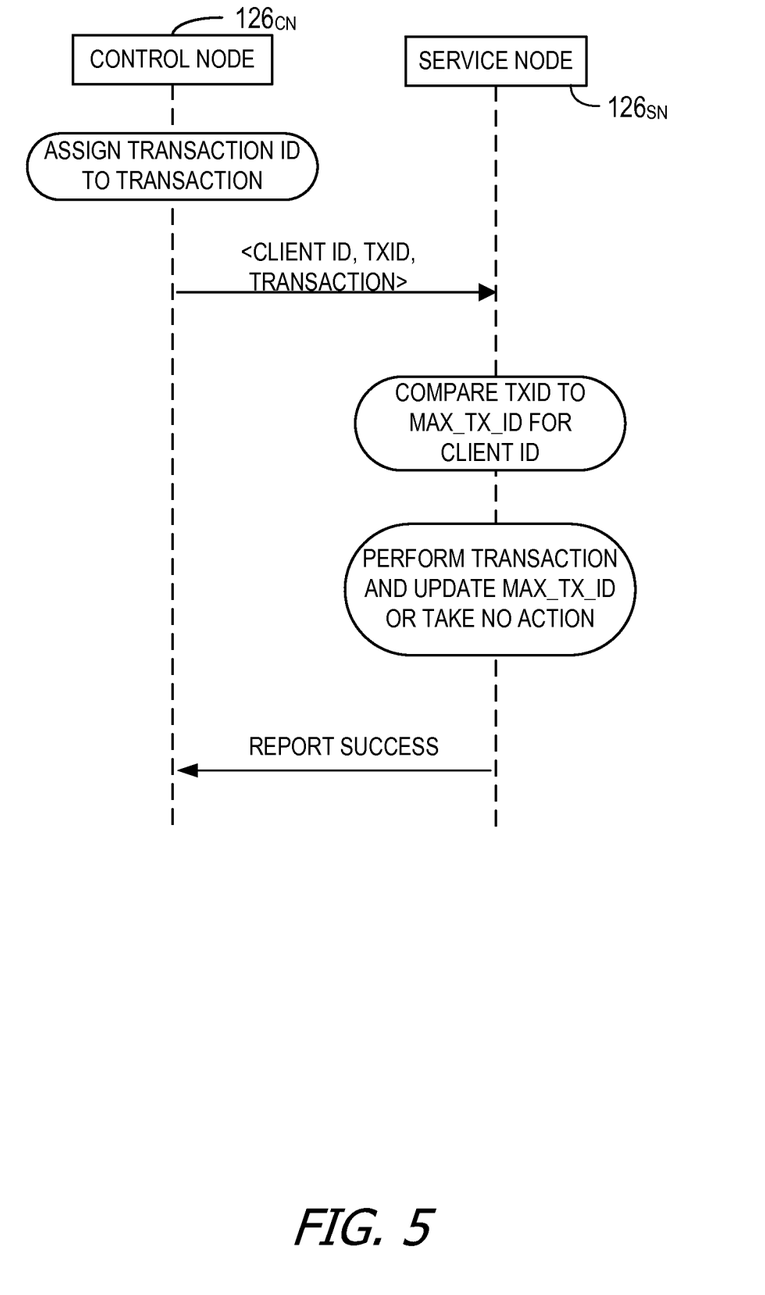
FIG. 5 is a sequence diagram illustrating the interaction between a control node and a service node during transaction processing under the disclosed method of redo-only write-ahead log transactions.

The operations of the exemplary method of 400 are carried out by a processor associated with the service node $126_{SN}$. The hypervisor 210 coordinates operations carried out by the processors associated with the control node $126_{CN}$ and the service node $126_{SN}$ and their associated vSANs. FIG. 5, described below, illustrates the sequence of the following events.

At 402 the service node $126_{SN}$ receives a request from the control node $126_{CN}$ to perform a transaction or a series of transactions. The disclosed method prevents the service node $126_{SN}$ from performing a transaction 506 unless it is the most recent, latest in time, or newest. The request includes three elements, a client ID 502, a transaction ID 504, and the transaction 506 itself. The client ID 502 corresponds to the storage object (hereinafter the transaction control object) that stores the fact that a transaction 506 has been issued, committed, or otherwise transmitted. In some examples, the transaction control object is the same as the control node $126_{CN}$. However, if the control node $126_{CN}$ dies, and another node 126 becomes the new control node $126_{CN}$, the client ID 502 of the transaction 504 does not change. The control node $126_{CN}$ writes the transaction ID 504 into an underlying transaction control object. In some examples, the universal unique identifier (UUID) of the transaction control object is used as the client ID 502. In that example, even if another node 126 takes over as the control node $126_{CN}$ of the storage object, the client ID 502 stays the same. In some examples, the client ID 502 is a name, number, or other form of nomenclature. The client ID 502 is persistent, regardless of failures amongst the nodes 126. In some examples, after the intention of the transaction 504 is written into the transaction control object, the transaction 504 can already be considered committed and the client can be acknowledged. This allows shorter latency compared to the 2-phase commit protocol where a transaction must be committed by all involved nodes 126 before clients can be acknowledged.

The transaction request also includes a transaction ID 504. The transaction ID 504 is, in some examples, assigned by the control node $126_{CN}$. In other examples it is assigned by a hypervisor 210, or other processor. The transaction ID 504 is, in some examples, a timestamp, hash of the time, or other variable indicating the time the transaction 506 was initiated. The final portion of the transaction request includes the transaction 506 itself, for example an instruction to write, read, increment, etc.

Figure 4:
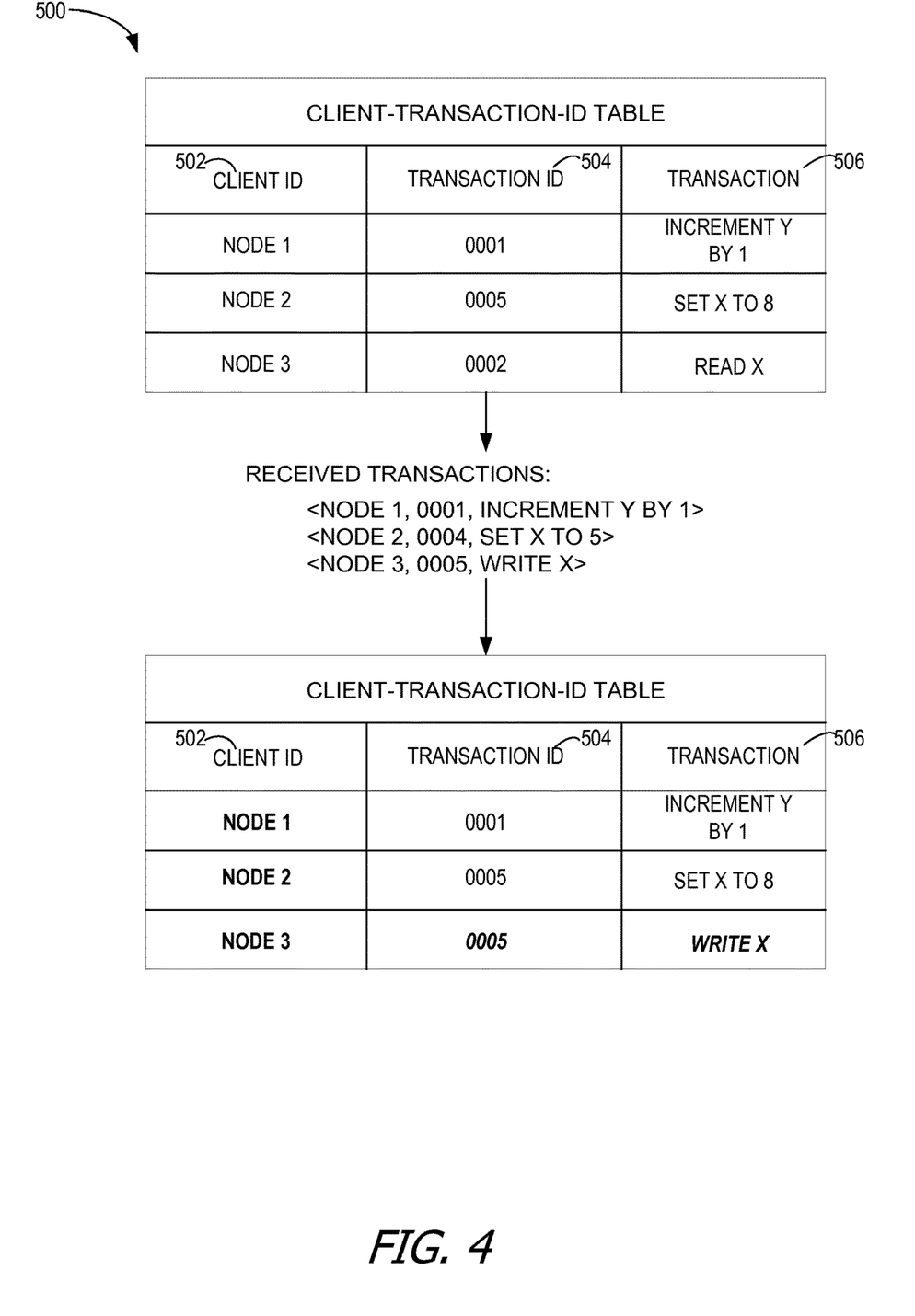
FIG. 4 is a block diagram of an exemplary client-transaction-ID table on a service node.

The service node 126SN searches the client-transaction-ID table 500 for the maximum transaction ID 504 associated with the client ID 502 at 404. The maximum transaction ID 504 corresponds to the newest, most recent, or latest in time transaction 506 issued by the control node $126_{CN}$. For example, if the transaction ID 504 is 0004, and it is associated with a transaction control object identified (in this example a node) with the ID of "Node 1", then the service node $126_{SN}$ searches for the maximum transaction ID 504 associated with Node 1. An example of the client-transaction-ID table 500 is illustrated in FIG. 4. In some examples, the transaction ID 504 is a timestamp. In other examples, the transaction ID 504 is incremented by the control node $126_{CN}$ with each new transaction the control node $126_{CN}$ transmits.

At 406 the transaction ID 504 of the current transaction 506 and its associated transaction control object client ID 502 is compared to the maximum transaction ID 504 found in the client-transaction-ID table 500. The maximum transaction ID 504 represents the most recent transaction received by the service node $126_{SN}$ associated with that client ID 502, and therefore its corresponding transaction control object. In some examples the transaction ID 504 is a timestamp, or other marker indicating order. In the example from the previous paragraph, assume a search of the client-transaction-ID table 500 reveals that the maximum transaction ID 504 for Node 1 is 0006. This maximum transaction ID 504 of 0006 is greater than the transaction ID 504 associated with the transaction control object. Since the current transaction ID 504 is less than (or in some examples equal to) the current maximum transaction ID 504 of the relevant transaction control object, this transaction is considered a duplicate, and it is not performed. However, the service node $126_{SN}$ still reports success to the control node $126_{CN}$ at 412 because the transaction had been performed previously. Not performing the transaction is not the same as aborting the transaction. The redo log is not capable of aborting (e.g., undoing) a transaction.

If, at 406, the transaction ID 504 of the current transaction 506 and its associated control node client ID 502 is greater than the maximum transaction ID 504 previously associated with that transaction control object client ID 502, then the transaction 506 is more recent, and it should be performed. The transaction 506 is written to the redo log 130, and the service node $126_{SN}$ performs the transaction at 408. At 410 the client-transaction-ID table 500 is updated with the new maximum transaction ID 504 for the appropriate transaction control object client ID 502. The service node $126_{SN}$ subsequently reports that the transaction was successful to the control node $126_{CN}$ at 412.

In one example, a control node $126_{CN}$, node A, transmits a series of transactions to a service node $126_{SN}$, node B. Node A subsequently fails. Node C attempts to recover from the failure of Node A, by reading the log of node A and transmitting the series of transactions to node B, again. Node B receives the replay of the log of Node A, and compares each transaction to its client-transaction-ID table 500. Node B finds that none of the transactions transmitted by node C are more recent than the last transaction. Therefore, node B concludes it already processed the transactions transmitted by node C. Since node B already processed the transactions sent by node C, when node A originally sent them, node B does not process those transactions again. Node B reports success to node C.

In another example, node A sends a series of transactions to node B. Node B processes the transactions from node A, but node B fails before it transmits success to node A. Since node A does not receive any response from node B, it assumes node B has failed, and it resends the transactions to node B. Node B, after recovering, receives the transactions from node A, a second time. However, since node B compares the transaction IDs 504 of each transaction, it again finds that none of the transactions from node A are newer than the previously sent transactions. Consequently, while node B reports success to node A, it does not re-perform the transactions.

Under previously existing two-phase commit protocols, if a service node $126_{SN}$ receives two instructions: write(10, B) and write(15, D), this will result in two entries in the undo log, two in the redo log. Specifically, the first transaction instructs a node to write to block 10, changing the contents from A to B (e.g., "write(10, B)"), thus the node would make two writes, one to the undo log would read "undo 10, old=A" and the second to the redo log would read "redo 10, new=B". Likewise, for the second transaction the node 126 makes an entry into the undo log, "undo 15, old=C", and the entry into the redo log would be "redo 15, new=D". The transactions, as written to the redo logs, would be performed by the service node $126_{SN}$ but the affected resources would be locked. In this fashion, each service node $126_{SN}$ executes the transaction up to the point of finally committing to the transaction, which requires the control node $126_{CN}$ to transmit the commit instruction to the service node $126_{SN}$. Any affected resources are locked, pending the resolution of the second phase of the two-phase commit protocol. In some examples, this is described as "preparing" or "preparing to commit".

The present disclosure utilizes fewer resources than the above example of two-phase commit, and is more efficient. No writes are made to the undo log, and no changes are made nor are transactions written to the redo log unless those transactions are the most recent transactions. The present disclosure eliminates the need to read from the undo log, which is costly and time-consuming.

FIG. 4 is a block diagram of an exemplary set of transactions 506, client-IDs 502, and transaction IDs 504 maintained by a node 126 illustrated in this example as a client-transaction-ID table 500. In some examples, this set is organized as a table, a database, a log, a matrix, etc. The client-transaction-ID table 500 on a service node $126_{SN}$ which receives and processes three transactions. In some examples, the client-transaction-ID table 500 records the client ID 502 of the control node $126_{CN}$, the transaction ID 504, and the transaction 506. FIG. 4 illustrates the client-transaction-ID table 500 before the transactions are received and processed (the table on top), and after they are received and processed (the table on bottom). Each node 126 or other element of the distributed system 120 includes a client-transaction-ID table 500. In the illustrated example, the service node $126_{SN}$ receives three transactions.

The first transaction 506 is associated with transaction control object Node 1 (e.g., the client ID 502 is "Node 1"), with the transaction ID 504 of 0001, and the transaction is to increment Y by 1. The service node $126_{SN}$ reviews the table and finds that Node 1 has a maximum transaction ID 504 of 0001. This is the same as the transaction ID 504 of the transaction 506 which was just received. Therefore, the transaction 506 is not performed, and the transaction ID is not changed.

The second transaction 506 is associated with Node 2. The transaction from transaction control object Node 2 has a transaction ID 504 of 0004 and instructs the service node $126_{SN}$ to set a variable X to 5. However, a search of the client-transaction-ID table 500 reveals that the maximum transaction ID 504 for Node 2 is 0005, which is greater than the transaction ID 504 which the service node $126_{SN}$ just received. Consequently, the service node $126_{SN}$ does not perform the transaction 506 nor does it update the transaction ID 504.

The final transaction 506 received by the service node $126_{SN}$ instructs the service node $126_{SN}$ to write the variable X. This transaction is associated with Node 3 and has a transaction ID 504 of 0005. The service node $126_{SN}$ searches its client-transaction-ID table 500 and discovers that the current maximum transaction ID 504 for Node 3 is 0002. Since the transaction ID 504 of the current transaction 506 is greater than 0002 indicating the transaction 506 is more recent than the current maximum transaction ID 504, the client-transaction-ID table 500 is updated to reflect a new transaction ID 504 of 0005 for Node 3, and the new transaction 506 is performed. The changes to the transaction ID 504 and transaction 506 of Node 3 are bolded and italicized in the client-transaction-ID table 500 at the bottom of FIG. 4.

FIG. 5 is a sequence diagram illustrating the interaction between a control node and a service node during transaction processing under the described method of redo-only write-ahead log transactions. The control node $126_{CN}$ assigns a transaction ID 504 to the transaction 506 it is distributing. The control node $126_{CN}$, in some examples, maintains its own record of the current transaction ID 504 and increments it when a new transaction 506 is created. Alternatively, the transaction ID 504 is, in some examples, a global variable maintained by the virtualization management platform 122, a hypervisor 210, processor 102, or some other element in communication with all of the elements of the distributed system 120.

The control node $126_{CN}$ then transmits the client ID 502 (e.g., the ID of the transaction control object, such as "Node 1", or another ID), the transaction ID 504, and the transaction 506 to the service nodes $126_{SN}$. The service node $126_{SN}$, upon receiving the transaction transmission from the control node $126_{CN}$, compares the transaction ID 504 to the maximum transaction ID 504 currently associated with that client ID 502 in the client-transaction-ID table 500. Based on the result of the comparison, the service node $126_{SN}$ either: performs the transaction 506 and updates the transaction ID 504 associated with the client ID 502 in the client-transaction-ID table 500, or the service node $126_{SN}$ takes no action. Regardless of whether the service node $126_{SN}$ performs the transaction 506 or not, it reports success to the control node $126_{CN}$.

Figure 6:
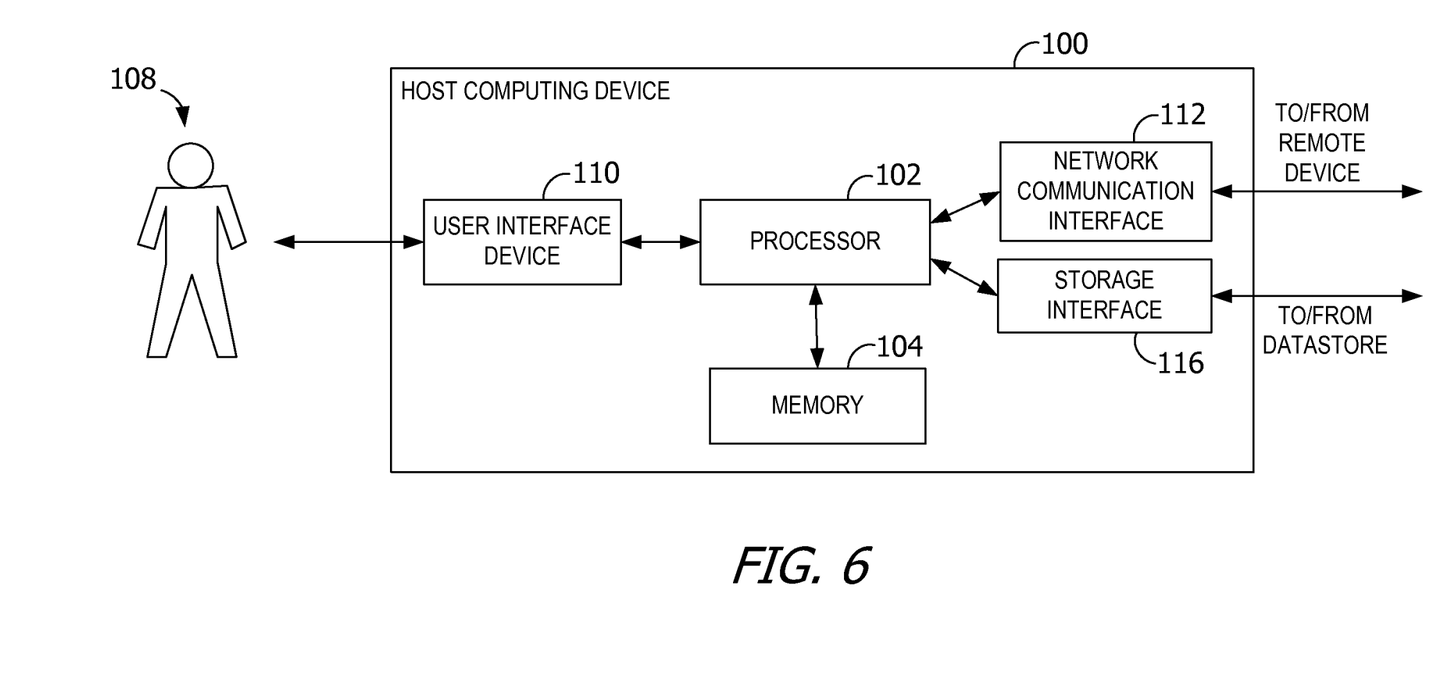
FIG. 6 is a block diagram of an exemplary host computing device capable of housing one or more elements of a distributed system performing the disclosed method of redo-only write-ahead log transactions.

FIG. 6 is a block diagram of an exemplary host computing device 100 which may process transactions in a distributed system. Host computing device 100 includes a processor 102 for executing instructions. In some examples, executable instructions are stored in a memory 104. Memory 104 is any device allowing information, such as executable instructions and/or other data, to be stored and retrieved. For example, memory 104 may include one or more random access memory (RAM) modules, flash memory modules, hard disks, solid state disks, and/or optical disks.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 110 operates to receive data from user 108, while another device (e.g., a presentation device) operates to present data to user 108. In other examples, user interface device 110 has a single component, such as a touch screen, that functions to both output data to user 108 and receive data from user 108. In such examples, user interface device 110 operates as a presentation device for presenting information to user 108. In such examples, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some examples, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In exemplary examples, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 7:
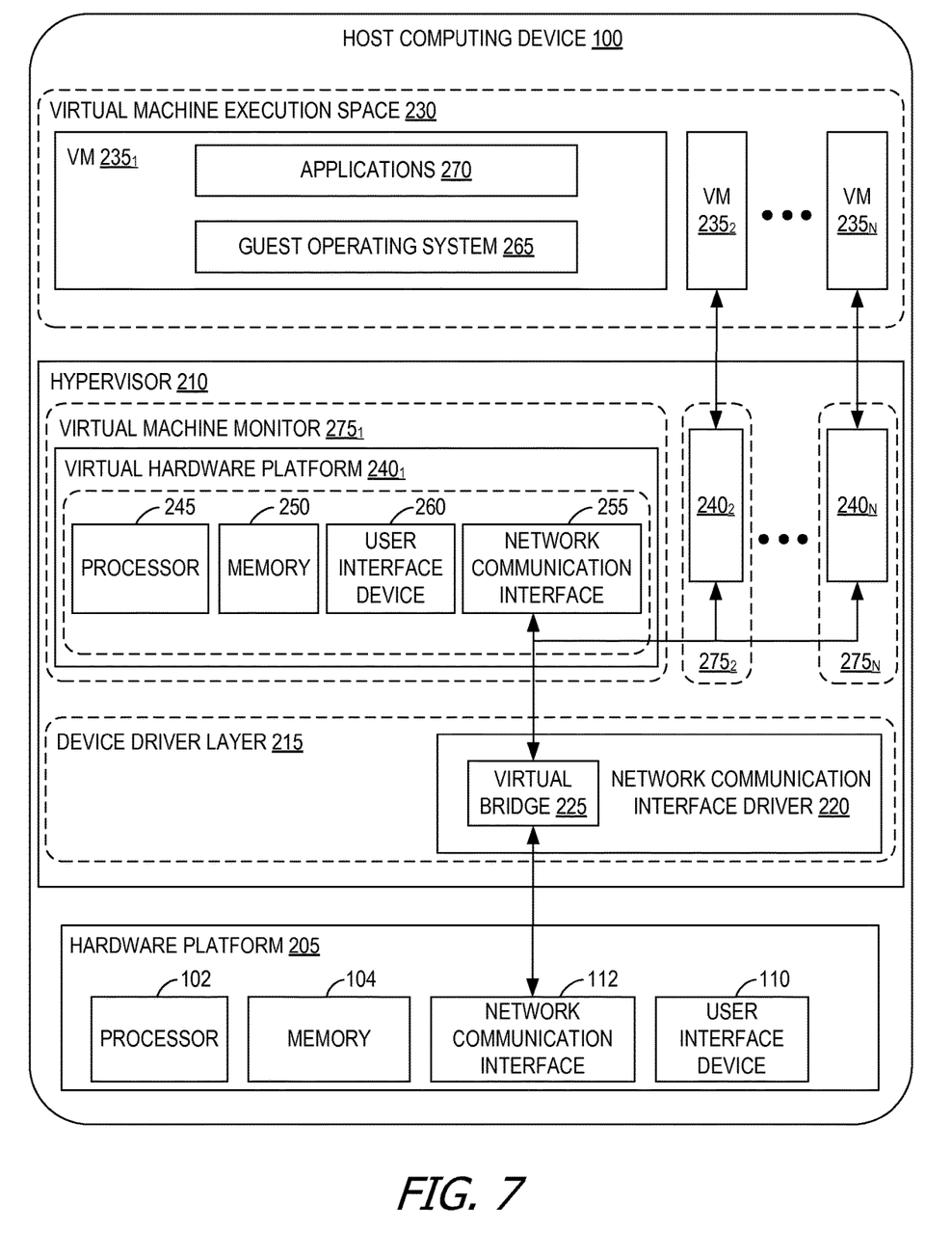
FIG. 7 is a block diagram of virtual machines utilizing the disclosed method of redo-only write-ahead log transactions.

FIG. 7 depicts a block diagram of virtual machines $235_1$, $235_2$ ... $235_N$ that are instantiated on host computing device 100. The illustrated virtual machines are examples of elements in a distributed system which operate the disclosed distributed transaction method. Host computing device 100 includes a hardware platform 205, such as an x86 architecture platform. Hardware platform 205 may include processor 102, memory 104, network communication interface 112, user interface device 110, and other input/output (I/O) devices, such as a presentation device 106 (shown in FIG. 6). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some examples, memory 250 in first virtual hardware platform $240_1$ includes a virtual disk that is associated with or "mapped to" one or more virtual disk images stored on a disk (e.g., a hard disk or solid state disk) of host computing device 100. The virtual disk image represents a file system (e.g., a hierarchy of directories and files) used by first VM $235_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an example, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ that implement virtual system support to coordinate operations between hypervisor 210 and corresponding VMs $235_1$-$235_N$. Those with ordinary skill in the art will recognize that the various terms, layers, and categorizations used to describe the virtualization components in FIG. 7 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an example of the disclosure is included as a component in VMware's ESX brand software, which is commercially available from VMware, Inc.

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some examples, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when programmed to execute the instructions described herein.

The examples illustrated and described herein as well as examples not specifically described herein but within the scope of aspects of the disclosure constitute exemplary means for receiving a transaction including a transaction identifier (ID) and a first element ID by a second element, exemplary means for comparing the received transaction ID to a set of transaction IDs, exemplary means for performing or not performing the transaction based on the comparison, and exemplary means for updating the set of transaction IDs only upon performing the transaction.

At least a portion of the functionality of the various elements illustrated in the figures may be performed by other elements in the figures, or an entity (e.g., processor, web service, server, application program, computing device, etc.) not shown in the figures.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

I claim:

1. A method for processing transactions among elements of a distributed system, said method comprising:
receiving, by a second element, a transaction, a transaction identifier (ID) and an ID of a first element, the received transaction ID indicating a recency of the received transaction, and wherein the first element and the second element are each one of a virtual machine or a computing device;
comparing, by the second element, the received transaction ID to a set of transaction IDs maintained by the second element to determine whether the received transaction is older than transactions previously performed, the set of transaction IDs corresponding to the transactions previously performed by the second element;

determining that the received transaction ID is older than the transactions previously performed;

based at least on determining that the received transaction ID is older than the transactions previously performed, determining, by the second element, to not perform the received transaction; and based at least on determining to not perform the received transaction, reporting to the first element that the received transaction was successfully performed.

2. The method of claim 1, wherein comparing the received transaction ID to the set of transaction IDs further comprises searching the set of transaction IDs for a latest transaction ID associated with the first element.

3. The method of claim 1, further comprising executing the received transaction only if the received transaction ID is greater than a maximum transaction ID, found in a table of transaction IDs, associated with the first element.

4. The method of claim 1, wherein comparing the received transaction ID to the set of transaction IDs further comprises accessing a latest transaction ID associated with the first element ID and performing the received transaction only if the received transaction ID is more recent than the accessed latest transaction ID.

5. The method of claim 1, wherein the set of transaction IDs is updated upon performing the received transaction.

6. The method of claim 1, further comprising performing the received transaction on condition that the received transaction ID is more recent than the transactions previously performed, and reporting to the first element that the received transaction was successfully performed.

7. The method of claim 1, wherein the second element does not maintain an undo log.

8. One or more computer storage media including computer-executable instructions that, when executed, cause at least one processor to process transactions among elements of a distributed computing system by:

receiving, by the at least one processor, a transaction, a transaction identifier (ID) and an ID of a first element, the received transaction ID indicating a recency of the received transaction, wherein the at least one processor corresponds to a second element, and wherein first element and the second element are each one of a virtual machine or a computing device;

comparing, by the at least one processor, the received transaction ID to a set of transaction IDs maintained by the second element to determine whether the received transaction is older than transactions previously performed, the set of transaction IDs corresponding to the transactions previously performed by the second element;

on condition that the received transaction ID is older than the transactions previously performed, determining, by the at least one processor, to not perform the received transaction; and based on determining to not perform the received transaction, reporting to the first element that the received transaction was successfully performed.

9. The computer storage media of claim 8, wherein the computer-executable instructions further cause the at least one processor to replay all transactions in an idempotent manner.

10. The computer storage media of claim 8, wherein the computer-executable instructions cause the at least one processor to execute the received transaction only if the received transaction ID is greater than a maximum transaction ID, found in a table of transaction IDs, associated with the first element.

11. A system for coordinating one or more transactions for a plurality of elements of a distributed system, said system comprising:

a distributed computing system associated with the plurality of elements, the plurality of elements sharing access to a storage area, wherein each of the plurality of elements is a virtual machine or a computing device; and a first processor for a first element of the plurality of elements, the first element programmed to:
assign a transaction identifier (ID) to a transaction, the transaction ID indicating a recency of the transaction; and
transmit the transaction including a first element ID and the transaction ID to a second element of the plurality of elements; and a second processor for the second element of the plurality of elements, the second element programmed to:
receive the transaction from the first element;
compare the received transaction ID to a set of stored transaction IDs to determine whether the received transaction is older than transactions previously performed, the set of stored transaction IDs corresponding to the transactions previously performed by the second element;
on condition that the received transaction ID is older than the transactions previously performed, determine to not perform the received transaction; and
based on determining to not perform the received transaction, report success to the first element.

12. The system of claim 11, wherein the plurality of elements are capable of processing distributed transactions.

13. The system of claim 11, wherein the set of stored transaction IDs further includes IDs of the plurality of elements, and transactions transmitted by the plurality of elements.

14. The system of claim 11, wherein the plurality of elements are coupled to a shared storage system, wherein the plurality of elements coupled to the shared storage system comprise elements that share access to the same storage or share access to storage of other elements, or both.

15. The system of claim 11, wherein comparing the received transaction ID to the set of stored transaction IDs further comprises accessing a latest transaction ID associated with the first element ID and performing the received transaction only if the received transaction ID is more recent than the accessed latest transaction ID.

16. The system of claim 15, further comprising updating a table of transaction IDs with the received transaction ID of the performed received transaction.

17. The system of claim 11, wherein the second element is further programmed to perform the received transaction on condition that the received transaction ID is more recent than the transactions previously performed, and report to the first element that the received transaction was successfully performed.

18. The computer storage media of claim 8, wherein the computer-executable instructions, when executed, further cause the at least one processor to perform the received transaction on condition that the received transaction ID is more recent than the transactions previously performed, and report to the first element that the received transaction was successfully performed.

19. The system of claim 17, wherein the set of transaction IDs is updated upon performing the received transaction.

20. The computer storage media of claim of claim 18, wherein the set of transaction IDs is updated upon performing the received transaction.

* * * * *